(12) United States Patent
Muth

(10) Patent No.: US 8,463,183 B2
(45) Date of Patent: *Jun. 11, 2013

(54) HEADSET CHARGE VIA SHORT-RANGE RF COMMUNICATION

(75) Inventor: James Michael Muth, Santa Ana, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,179

(22) Filed: Jun. 5, 2012

(65) Prior Publication Data

US 2012/0242294 A1    Sep. 27, 2012

Related U.S. Application Data

(63) Continuation of application No. 12/367,234, filed on Feb. 6, 2009, now Pat. No. 8,213,862.

(51) Int. Cl.
*H04B 5/00* (2006.01)

(52) U.S. Cl.
USPC .......................................... 455/41.2; 455/573

(58) Field of Classification Search
USPC ................... 455/41.1, 41.2, 41.3, 573, 575.2
See application file for complete search history.

(56) References Cited

U.S. PATENT DOCUMENTS

| 5,590,417 | A | * | 12/1996 | Rydbeck | 455/575.2 |
|---|---|---|---|---|---|
| 5,905,372 | A | | 5/1999 | Kuffner et al. | |
| 6,127,799 | A | * | 10/2000 | Krishnan | 320/104 |
| 7,215,976 | B2 | | 5/2007 | Brideglall | |
| 7,567,824 | B2 | * | 7/2009 | Mickle et al. | 455/573 |
| 7,805,112 | B2 | | 9/2010 | Ginggen et al. | |
| 8,024,012 | B2 | | 9/2011 | Clevenger et al. | |
| 8,213,862 | B2 | * | 7/2012 | Muth | 455/41.2 |
| 2010/0203831 | A1 | | 8/2010 | Muth | |

* cited by examiner

*Primary Examiner* — Hai L Nguyen
(74) *Attorney, Agent, or Firm* — Sterne, Kessler, Goldstein & Fox P.L.L.C.

(57) ABSTRACT

Embodiments of the present invention enable energy transfer via short-range RF communication between a main device and an associated device, thereby allowing the main device to energy charge the associated device. Accordingly, the need for a separate charger for the associated device can be eliminated. Embodiments of the present invention are suitable for applications in which the main device and the associated device operate in close proximity to each other. Further, embodiments of the present invention are suitable for applications in which the associated device is more energy-constrained than the main device. According to embodiments, energy transfer applications can be supported using near field communication (NFC). In an embodiment, energy transfer via NFC is enabled between a Bluetooth enabled cellular phone and a Bluetooth headset. In another embodiment, energy transfer via NFC is enabled between a Bluetooth enabled digital camera and a Bluetooth enabled digital frame.

18 Claims, 4 Drawing Sheets

HEADSET CHARGE VIA SHORT-RANGE RF COMMUNICATION

CROSS-REFERENCE TO RELATED APPLICATIONS

The present application is a continuation of U.S. patent application Ser. No. 12/367,234, filed Feb. 6, 2009, now U.S. Pat. No. 8,213,862, which is incorporated herein by reference in its entirety.

BACKGROUND OF THE INVENTION

1. Field of the Invention

The present invention relates generally to energy transfer applications via short-range radio frequency (RF) communication technology.

2. Background Art

A host of communication applications involve interaction between a main device and an associated device. An example includes Bluetooth communication between a Bluetooth enabled cellular phone and a Bluetooth headset.

Today, a separate charger/power supply is used for each of the main device and the associated device. In mobile applications, the user is thus burdened by having to carry along multiple chargers in order to ensure that the main device and the associated device are adequately charged. In addition, having numerous chargers clutters a user's space.

BRIEF SUMMARY OF THE INVENTION

The present invention relates generally to energy transfer applications via short-range RF communication technology.

Embodiments of the present invention enable energy transfer via short-range RF communication between a main device and an associated device, thereby allowing the main device to energy charge the associated device. This allows the associated device charger to be supplemented or completely eliminated.

Embodiments of the present invention are suitable for applications in which the main device and the associated device operate in close proximity to each other. Further, embodiments of the present invention are suitable for applications in which the associated device is more energy-constrained than the main device.

According to embodiments, energy transfer applications can be supported using near field communication (NFC). In an embodiment, energy transfer via NFC is enabled between a Bluetooth enabled cellular phone and a Bluetooth headset.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present, invention will be described with reference to the accompanying drawings. Generally, the drawing in which an element first appears is typically indicated by the leftmost digit(s) in the corresponding reference number.

DETAILED DESCRIPTION OF EMBODIMENT(S)

Figure 1:
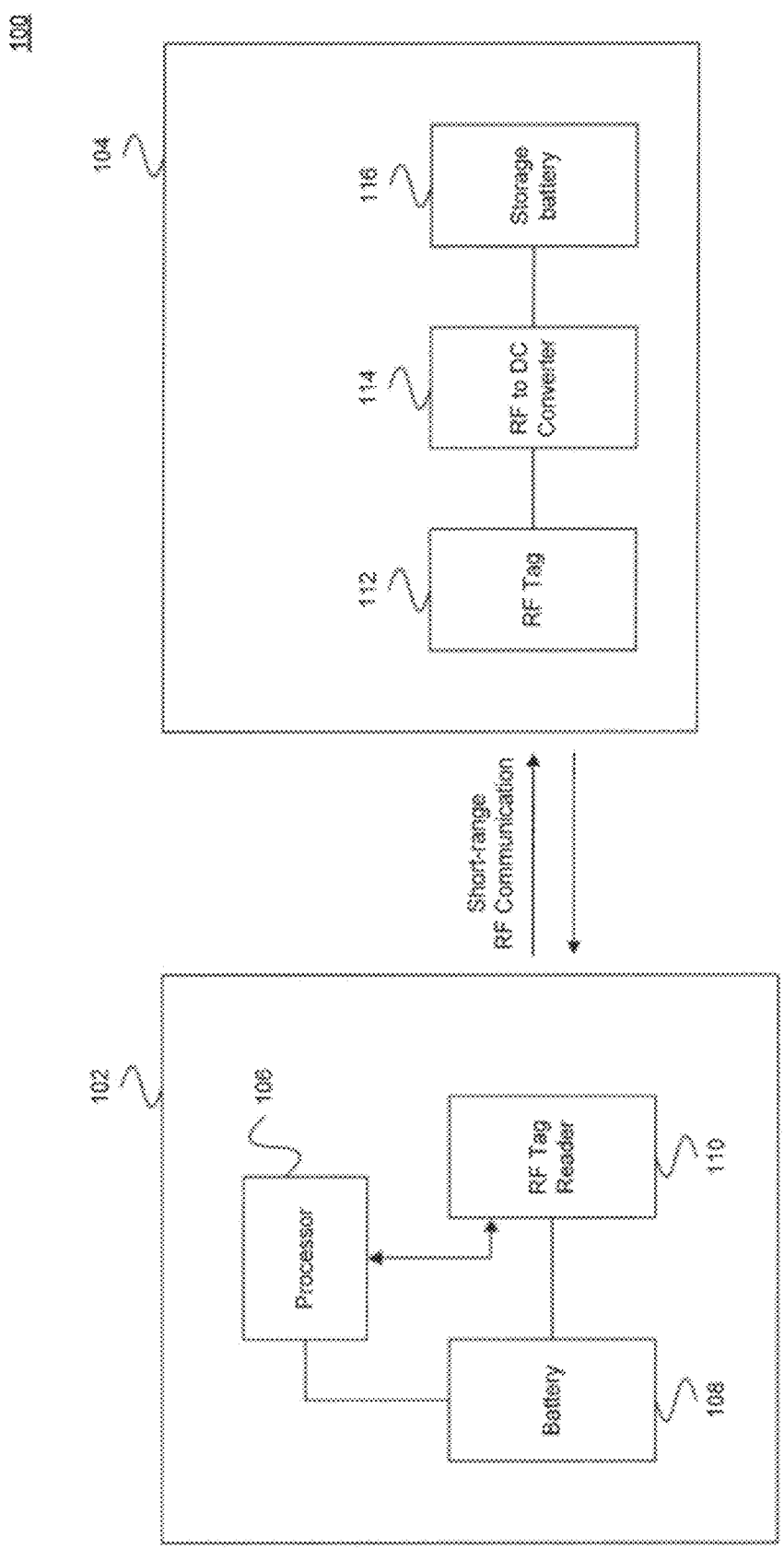
FIG. 1 is a block diagram that illustrates an example system according to an embodiment of the present invention.

FIG. 1 is a block diagram that illustrates an example system 100 according to an embodiment of the present invention. Example system 100 includes a main device 102 and an associated device 104. In an embodiment, the relationship between main device 102 and associated device 104 is such that associated device 104 provides an add-on or complementary feature to main device 102. In another embodiment, main device 102 and associated device 104 operate in close proximity to each other such that short-range RF communication can be sustained between the two. Further, generally, associated device 104 runs on a smaller energy supply than main device 102 and/or is more energy-constrained than main device 102.

According to an embodiment, main device 102 and associated device 104 are both Bluetooth enabled. Main device 102 may be any Bluetooth enabled device, including a mobile device such as a cellular phone, for example. Associated device 102 may be any Bluetooth enabled object operable to communicate via Bluetooth with main device 102. Main device 102 and associated device 104 may communicate any type of data, including text, audio, and video. In an embodiment, main device 102 includes a Bluetooth enabled cellular phone, and associated device 104 includes a Bluetooth headset.

As shown in FIG. 1, main device 102 includes a processor 106, a battery 108, and a RF tag reader 110. Battery 108 provides energy to power processor 106 and RF tag reader 110. Processor 106 and RF tag reader 110 communicate by means of an interface. In an embodiment, processor 106 controls RF tag reader 110.

Associated device 104 includes a RF tag 112, a RF to DC converter 114, and storage battery 116. RF tag 112 is coupled to RF to DC converter 114, which is coupled to storage battery 116. Generally, RF tag 112 includes an integrated circuit for storing information, and an antenna for transmitting and receiving RF signals according to a short-range RF communication technology. In other implementations, the antenna may be separate from RF tag 112.

In an embodiment, RF tag reader 110 of main device 102 and RF tag 112 of associated device 104 are configured to communicate with each other via a short-range RF communication technology (e.g., NFC). In an embodiment, RF tag reader 110 reads an identification code from RF tag 112, which identifies associated device 104 to main device 102. Further, RF tag reader 110 and RF tag 112 may be used to establish a pairing between main device 102 and associated device 104. In an embodiment, pairing main device 102 and associated device 104 includes performing an authentication process via RF tag reader 110 and RF 112, which allows for subsequent trusted data communication between main device 102 and associated device 104. In an embodiment, pairing via RF tag reader 110 and RF tag 112 includes placing RF tag reader 110 in contact with or in close proximity of RF tag 112 so that the pairing process can take place.

In addition, according to an embodiment, RF tag reader 110 and RF tag 112 may be used to enable energy charging and/or powering of associated device 104 by main device 102. For example, upon successful pairing between main device 102 and associated device 104, RF tag reader 110 and RF tag 112 may be used to transfer energy from main device 102 to associated device 104. The transferred energy can be used to power associated device 104 and/or to energy charge storage battery 116 of associated device 104.

Accordingly, in an embodiment, RF tag reader 110 transmits RF energy to RF tag 112, which directs the received RF energy to a RF to DC converter 114. RF to DC converter 114 converts the received RF energy to a DC signal and provides the generated DC signal to storage battery 116 to charge storage battery 116. Alternatively, or additionally, the generated DC signal is used to power circuitry within associated device 104.

Figure 2:
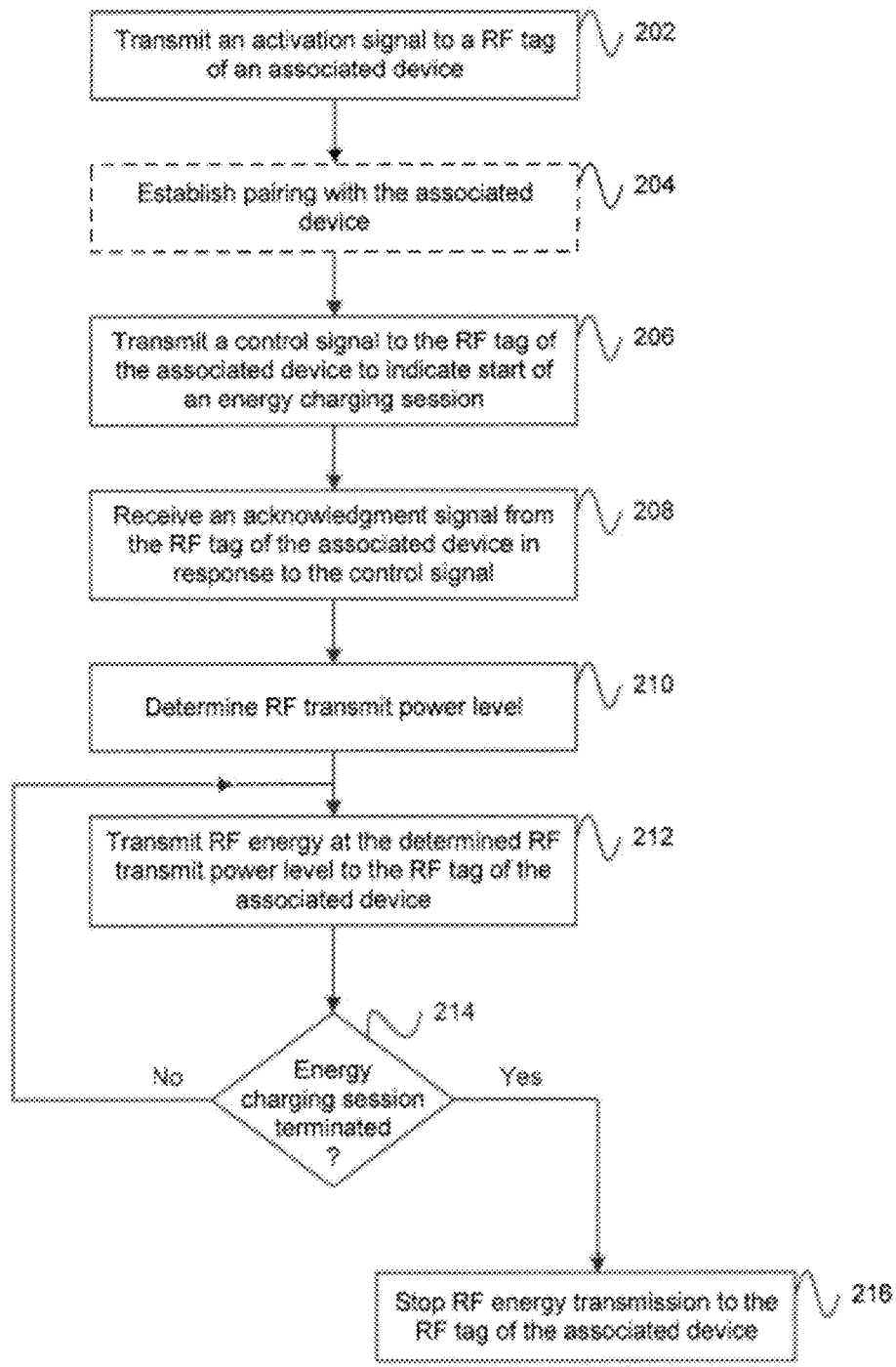
FIG. 2 is a process flowchart of a method of energy charging an associated device by a main device via a short-range RF communication technology according to an embodiment of the present invention.

FIG. 2 is a process flowchart 200 of a method of energy charging an associated device by a main device via a short-range RF communication technology according to an embodiment of the present invention. Process 200 is generally performed at the main device. For example, process 200 may be performed at a cellular phone to energy charge an associated Bluetooth headset.

Process 200 begins in step 202, which includes transmitting an activation signal to a RF tag of an associated device. The activation signal causes an inductive current to be generated at the RF tag, activating the RF tag. In an embodiment, step 202 is performed by a RF tag reader of the main device. In an embodiment, step 202 includes transmitting an activation signal from a NFC reader of a cellular phone to a NFC tag of a Bluetooth headset.

Optionally, in step 204, process 200 includes establishing pairing with the associated device. In an embodiment, step 204 is performed when pairing has not been established previously with the associated device. In an embodiment, step 204 includes establishing Bluetooth pairing with a Bluetooth headset via NFC communication with the NFC tag of the Bluetooth headset.

In step 206, process 200 includes transmitting a control signal to the RF tag of the associated device to indicate the start of an energy charging session. Then, step 208 includes receiving an acknowledgment signal from the RF tag of the associated device in response to the control signal. In an embodiment, steps 206 and 208 are performed by the RF tag reader of the main device.

Subsequently, in step 210, process 200 includes determining a RF transmit power level of the RF tag reader. In an embodiment, the RF transmit power level of the RF tag reader depends on (a) the energy level of the battery of the main device; and/or (b) whether the main device is connected to an AC power source.

Then, in steps 212 and 214, process 200 includes transmitting energy to the associated device until the energy charging session is terminated. In particular, step 212 includes transmitting RF energy at the determined RF transmit power level to the RF tag of the associated device. In an embodiment, step 212 is performed by the RF tag reader of the main device via a short-range RF communication technology. For example, step 212 can be performed by a NFC reader of a cellular phone via NFC. In an embodiment, process 200 further includes, during the energy charging session, increasing optionally the determined RF transmit power level when the main device becomes connected to an AC power source.

When the energy charging session is terminated at step 214, process 200 proceeds to step 216, which includes stopping RF energy transmission to the RF tag of the associated device. In an embodiment, terminating an energy charging session includes receiving a control signal by the RF tag reader; and terminating RF energy transmission from the RF tag reader to the RF tag of the associated device in response to the received control signal. According to embodiments, the control signal may be due to one or more of an energy charging termination signal received by the RF tag reader from the RF tag of the associated device (when the storage battery of the associated device is fully charged, for example); a user command by a user of the main device; loss of communication with the RF tag of the associated device; the battery level of the main device dropping below a determined threshold; and disconnecting the main device from an AC power source.

Figure 3:
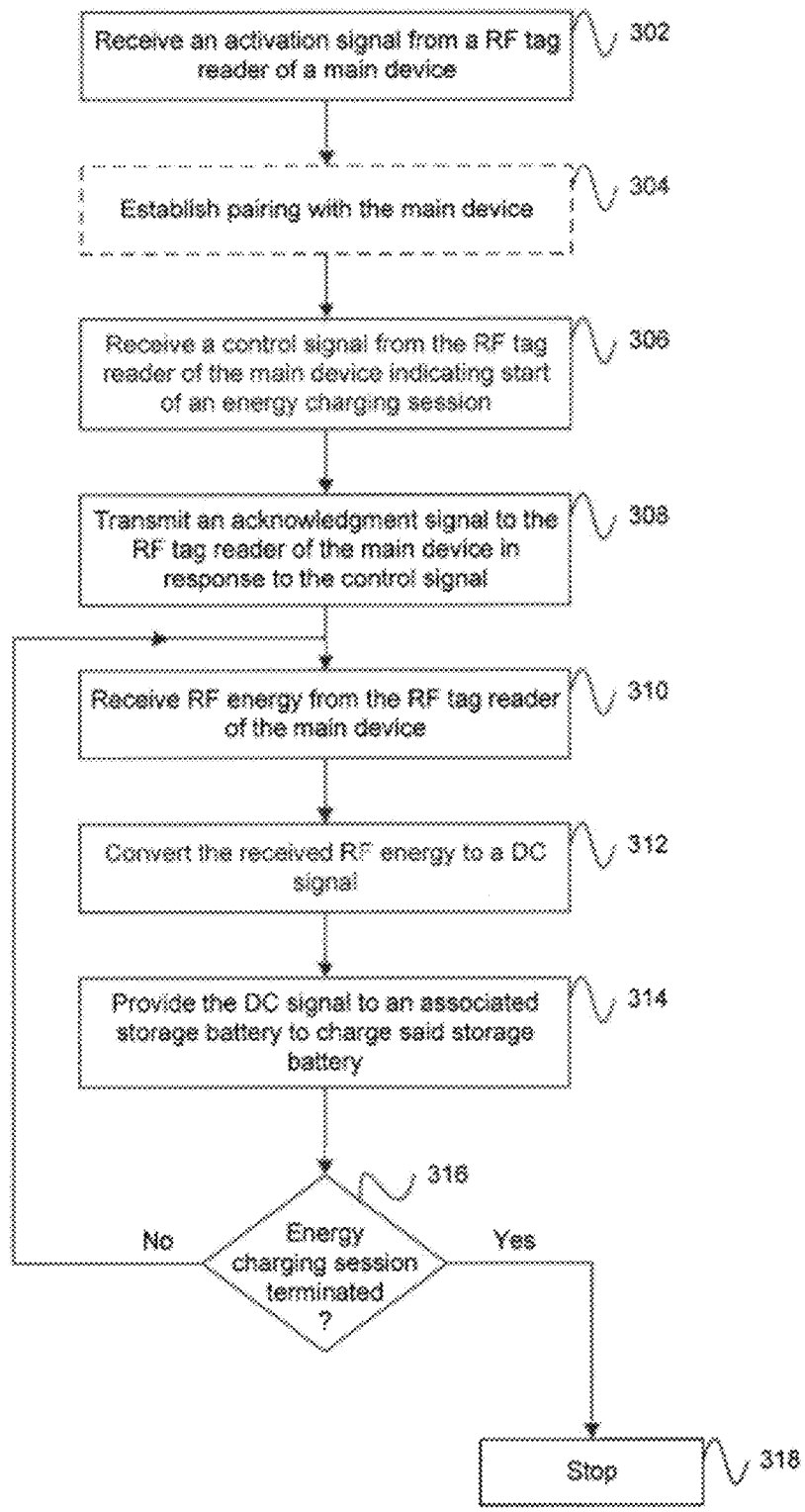
FIG. 3 is a process flowchart of a method of energy charging an associated device by a main device via a short-range RF communication technology according to an embodiment of the present invention.

FIG. 3 is a process flowchart 300 of a method of energy charging an associated device by a main device via a short-range RF communication technology according to an embodiment of the present invention. Process 300 is generally performed at the associated device. For example, process 300 may be performed at a Bluetooth headset being charged by a Bluetooth enabled cellular phone.

Process 300 begins in step 302, which includes receiving an activation signal at a RF tag of the associated device from a RF tag reader of the main device.

Optionally, in step 304, process 300 includes establishing pairing with the main device. In an embodiment, step 304 is performed when pairing has not been established previously with the main device. In an embodiment, step 304 includes establishing Bluetooth pairing with a Bluetooth enabled cellular phone via NFC communication with a NFC reader of the cellular phone.

In step 306, process 300 includes receiving a control signal from the RF tag reader of the main device indicating the start of an energy charging session. Then, step 308 includes transmitting an acknowledgment signal to the RF tag reader of the main device in response to the control signal. In an embodiment, steps 306 and 308 are performed by the RF tag of the associated device.

Subsequently, in steps 310 through 316, process 300 includes receiving energy from the RF tag reader of the main device and using the received energy to power the associated device and/or to charge a storage battery of the associated device, until the energy charging session is terminated.

In particular, in step 310, process 300 includes receiving RF energy from the RF tag reader of the main device. In an embodiment, step 310 is performed by the RF tag of the associated device. Then, in step 312, process 300 includes converting the received RF energy to a DC signal. In an embodiment, step 312 is performed by a RF to DC converter, which may be integrated within or separate from the RF tag of the associated device. Then, in step 314, process 300 includes providing the generated DC signal to the storage battery of the associated device to charge said storage battery. Alternatively, or additionally, process 300 includes using the generated DC signal to power circuitry within the associated device.

When the energy charging session is terminated at step 316, process 300 proceeds to step 318, which includes ending process 300. According to embodiments of the present invention, an energy charging session may be terminated by the main device, the associated device, or due to other reasons. When the energy charging session is sought to be terminated by the associated device, process 300 may further include transmitting an energy charging termination signal from the RF tag of the associated device to the RF tag reader of the main device. In an embodiment, an energy charging termination signal is transmitted when the storage battery of the associated is fully charged.

Figure 4:
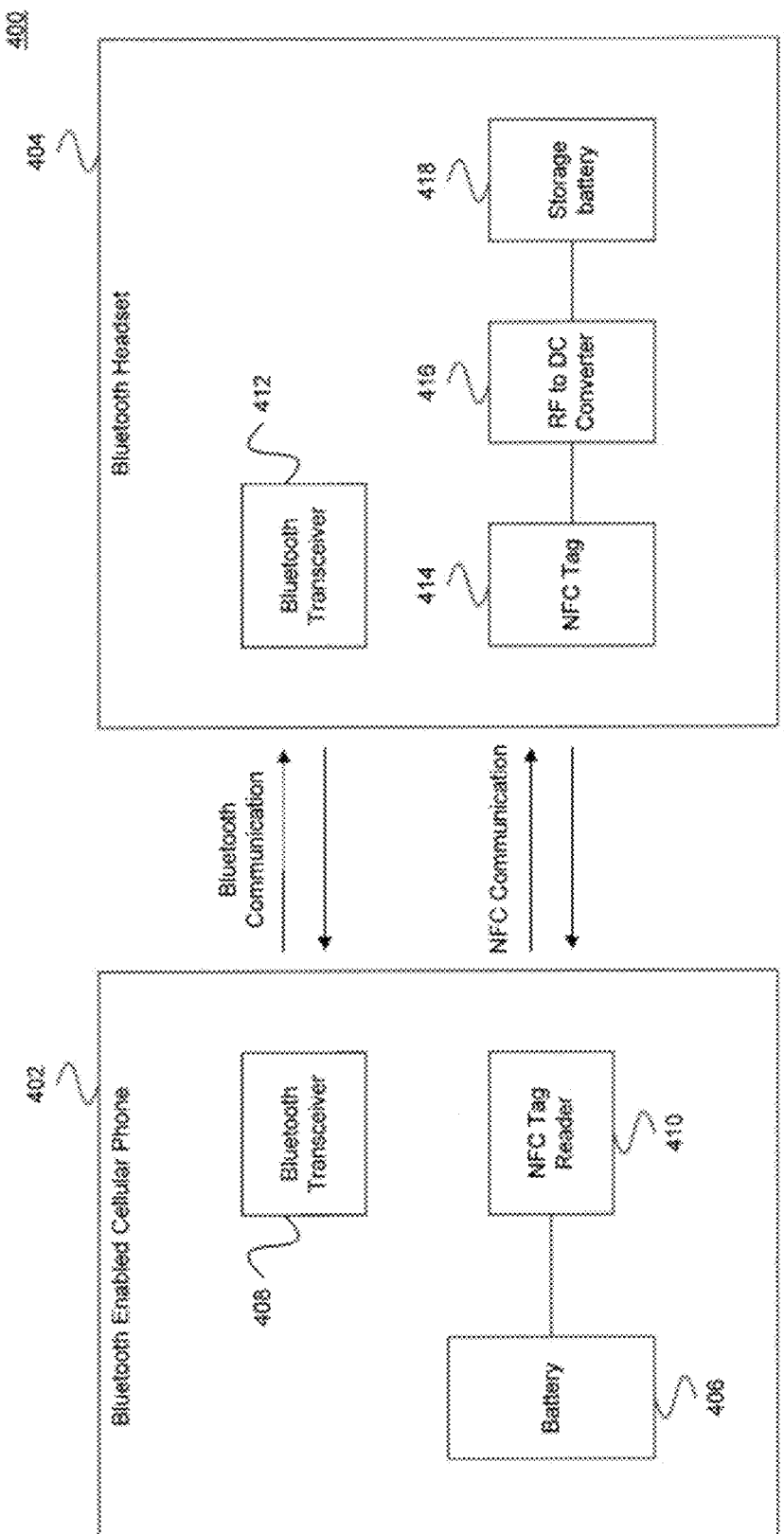
FIG. 4 is a block diagram that illustrates an example system application according to an embodiment of the present invention.

FIG. 4 is a block diagram that illustrates an example system application 400 according to an embodiment of the present invention. Example system application 400 involves a Bluetooth enabled cellular phone 402 and a Bluetooth headset 404. As would be understood by a person skilled in the art based on the teachings herein, embodiments of the present invention can be used to enable a multitude of system applications in addition to the example applications described herein.

As shown in FIG. 4, cellular phone 402 includes a battery 406, a Bluetooth transceiver 408, and a NFC reader 410. Bluetooth headset 404 includes a Bluetooth transceiver 412, a NFC tag 414, a RF to DC converter 416, and a storage battery 418. In an embodiment, RF to DC converter 416 is integrated within NFC tag 414.

Bluetooth transceivers 408 and 412 enable Bluetooth communication between cellular phone 402 and Bluetooth headset 404. In an embodiment, Bluetooth communication allows cellular phone 402 to direct incoming voice to Bluetooth headset 404 and to receive outgoing voice from Bluetooth headset 404.

NFC reader 410 and NFC tag 414 enable NFC communication between cellular phone 402 and Bluetooth headset 404. In an embodiment, NFC tag 414 is configured to identify Bluetooth headset 404 to cellular phone 402 via NFC reader 410. In another embodiment, NFC reader 410 and NFC tag 414 are configured to Bluetooth pair cellular phone 402 and Bluetooth headset 404, thus allowing for subsequent trusted Bluetooth communication between the two.

In an embodiment, following successful Bluetooth pairing via NFC of cellular phone 402 and Bluetooth headset 404, cellular phone 402 may be used to power Bluetooth headset 404 and/or energy charge storage battery 418 of Bluetooth headset 404. Accordingly, in an embodiment, NFC reader 410 and NFC tag 414 are configured to transfer energy via NFC from cellular phone 402 to Bluetooth headset 404. The transferred energy is received by NFC tag 414, converted from RF energy to a DC signal by RF to DC converter 416, and then used to energy charge storage battery 418 and/or to power circuitry within Bluetooth headset 404.

In an embodiment, an energy charging session via NFC between cellular phone 402 and Bluetooth headset 404 includes communicating control signals to indicate the start and end of the energy charging session. Accordingly, in an embodiment, NFC tag 414 is configured to receive an energy charging start signal from NFC reader 410 and to transmit an acknowledgment signal in response to the energy charging signal to NFC reader 410. In another embodiment, NFC tag 414 is further configured to transmit an energy charging termination signal to NFC reader 410 when storage battery 418 of Bluetooth headset 404 is fully charged.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of energy charging a wireless device via a short-range radio frequency (RF) communication technology, comprising:

receiving an energy charging start signal at a RF tag of the wireless device from a RF tag reader of a cellular phone;

transmitting an acknowledgment signal in response to the energy charging start signal from the RF tag of the wireless device to the RF tag reader of the cellular phone;

receiving RF energy at the RF tag of the wireless device from the RF tag reader of the cellular phone;

converting the received RF energy to a DC signal; and providing the DC signal to a storage battery of the wireless device.

2. The method of claim 1, further comprising:

receiving an activation signal at the RF tag of the wireless device from the RF tag reader of the cellular phone.

3. The method of claim 1, further comprising:

establishing pairing with the cellular phone via the RF tag reader of the cellular phone.

4. The method of claim 1, further comprising:

using the DC signal to power circuitry of the wireless device.

5. The method of claim 1, further comprising;

transmitting an energy charging termination signal from the RF tag of the wireless device to the RF tag reader of the cellular phone when the storage battery is fully charged.

6. The method of claim 1, wherein the wireless device includes a Bluetooth headset.

7. The method of claim 1, wherein the short-range RF communication technology is near field communication (NFC).

8. The method of claim 7, wherein the RF tag includes a NFC tag and the RF tag reader includes a NFC reader.

9. A wireless device, comprising:

a transceiver configured to communicate via a first communication technology with a respective transceiver of a cellular phone;

a radio frequency (RF) tag configured to receive an energy charging start signal from a RF tag reader of the cellular phone, transmit an acknowledgment signal in response to the energy charging start signal to the RF tag reader of the cellular phone, and receive RF energy from the RF tag reader of the cellular phone via a second communication technology; and a RF to DC converter configured to convert the received RF energy into a DC signal and to provide the DC signal to a storage battery of the wireless device.

10. The wireless device of claim 9, wherein the RF tag is further configured to receive an activation signal from the RF tag reader of the cellular phone.

11. The wireless device of claim 9, wherein the RF tag is further configured to identify the wireless device to the RF tag reader of the cellular phone.

12. The wireless device of claim 9, wherein the RF tag is further configured to pair the wireless device with the cellular phone.

13. The wireless device of claim 9, wherein the RF tag is further configured to transmit an energy charging termination signal to the RF tag reader when the storage battery of the wireless device is fully charged.

14. The wireless device of claim 9, wherein the RF to DC converter is integrated within the RF tag.

15. The wireless device of claim 9, wherein the second communication technology is near field communication (NFC).

16. The wireless device of claim 15, wherein the RF tag includes a NFC tag, and wherein the RF tag reader includes a NFC reader.

17. The wireless device of claim 9, wherein the first communication technology is Bluetooth.

18. The wireless device of claim 17, wherein the wireless device includes a Bluetooth headset.

\* \* \* \* \*